United States Patent [19]

Meserol et al.

[11] 3,897,688

[45] Aug. 5, 1975

[54] MICROBIAL SURFACE SAMPLER

[75] Inventors: Peter Meserol, East Northport; Phyllis Riely, Northport; Dom Spinosa, Wantagh; Fred Hodgson, Centereach, all of N.Y.

[73] Assignee: East/West Medical Products, Inc., Farmingdale, N.Y.

[22] Filed: Oct. 12, 1973

[21] Appl. No.: 405,991

Related U.S. Application Data

[63] Continuation of Ser. No. 233,450, March 10, 1972.

[52] U.S. Cl. .................................. 73/425; 195/103.5

[51] Int. Cl. ........................... G01n 1/02; C12k 1/04

[58] Field of Search .................. 73/421 R, 425, 421; 195/139, 103.5

[56] References Cited

UNITED STATES PATENTS

| | | | |
|---|---|---|---|
| 3,074,276 | 1/1963 | Moos | 73/425 |
| 3,091,967 | 6/1963 | Hurdlow et al. | 73/425 |
| 3,107,204 | 10/1963 | Brown et al. | 195/103.5 |
| 3,389,966 | 6/1968 | Saravis | 195/127 |
| 3,415,361 | 12/1968 | Adams et al. | 195/103.5 |
| 3,554,039 | 6/1967 | Braun | 73/425 |

*Primary Examiner*—S. Clement Swisher

[57] ABSTRACT

A surface sampler system including a surface sampler disc incorporating material of high magnetic permeability and having a normally recessed surface sampling material and a disc application device for displacing said disc from a cartridge into registration with a plunger. Displacement of said plunger serves to project the surface sampling material from the disc and engages said material against the surface to be sampled. Permanent magnets in the plunger may retain the disc when the device is lifted from the surface.

27 Claims, 16 Drawing Figures

MICROBIAL SURFACE SAMPLER

This is a continuation of application Ser. No. 233,450, filed Mar. 10, 1972.

BACKGROUND OF THE INVENTION

This invention relates to surface sampling systems adapted for obtaining microbiological specimens from environmental surfaces. In many instances, it is essential that environmental surfaces such as walls, furniture, and machinery be maintained essentially free of microbial contamination. Examples of such instances include areas of hospitals and doctors' offices and manufacturing facilities for the manufacture of drugs and the processing of food. In the art, such surface samples are generally taken either by the use of pre-poured media plates which are placed directly in contact with the surface to be sampled or by wiping the environmental surface by means of pads or swabs of sampling material and depositing the pads in a petri dish for the transfer thereto of any microbial samples which may have been picked up. In the case of swabs, the media surface would be wiped with the swab. The prior art approaches offer substantial disadvantes, due to the lack of uniformity of procedures. Thus, the area represented by each sample, as well as the pressure utilized to engage the pad against the surface would vary from sample to sample. These variations prevent the formulation of meaningful standards, as well as providing imperfect protection in an area of critical medical and epidemiological interest. By providing an integrated system for performing microbial surface sampling under controlled conditions, the foregoing deficiencies in the prior art have been overcome.

SUMMARY OF THE INVENTION

Generally speaking, in accordance with the invention, a surface sampler device is provided for use with surface sampler discs having normally recessed surface sampling material positioned for projection through an aperture in said discs. Said device includes a housing having an aperture therethrough, a cartridge for holding said discs, means for sequentially feeding one of said discs from said cartridge into registration with said aperture and a plunger means, and means for displacing the plunger means to displace said disc through said aperture to the surface to be sampled while projecting said surface sampling material and engaging said surface sampling material against said surface.

The surface sampling disc may include a material of high magnetic permeability for cooperation with permanent magnet means in said plunger means for retaining said disc when said device is removed from said surface. Said plunger means may include a central plunger member and an outer plunger member including said permanent magnet. Means would be provided for selectively displacing either said central plunger member alone or a combination of said central and outer plunger members for the selective retention of the disc with the device.

Said surface sampler discs include a housing having apertures in upper and lower surfaces thereof, said housing receiving and retaining said surface sampling material extending across said lower aperture and further receiving means displaceable from a first position spaced from said lower aperture to a second position at which said means projects said surface sampling material through said lower aperture in response to a plunger passing through said upper aperture. Said displaceable means may include a bellville spring member normally disposed with the concave surface thereof facing said bottom aperture and adapted for flexing in response to pressure on its convex surface to reverse the curvature thereof.

In a further embodiment of said disc, said displaceable means includes a plunger member having a central portion projecting toward said bottom opening.

The microbial surface sampler system in accordance with the invention may include a transfer member having a displaceable plunger and permanent magnet means disposed about said displaceable plunger for cooperation with the material of high permeability included in said discs to permit said transfer device to pick up a disc from a surface and deposit same in a culture plate. Said culture plate may be formed with a pair of spaced upstanding walls for cooperation with laterally projecting flanges on said transfer device for positioning said disc relative to the culture medium in said culture plate, the projecting surface sampling material of said disc being engaged against said culture medium by the plunger of said transfer device. In another embodiment, said culture plate is provided with a plurality of apertures dimensioned to receive said disc and containing culture medium on the bottom thereof.

Accordingly, it is an object of this invention to provide a microbial surface sampling system which will permit the performance of uniform and repeatable surface sampling.

Another object of the invention is to provide a microbial sampling system incorporating disposable sampling discs which may be dispensed from a cartridge and maintained sterile before use.

A further object of the invention is to provide a microbial sampling system which permits quick and efficient transfer of the microbial sample to a culture medium while providing means for maintaining identification of each sample in said medium.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
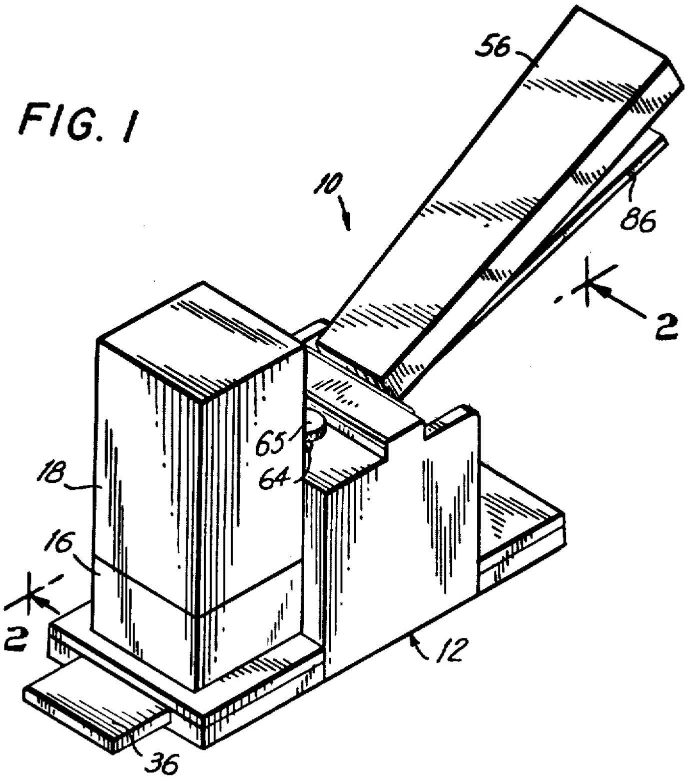
FIG. 1 is a perspective view of a microbial surface sampler device in accordance with the invention.

Referring now to FIGS. 1–6, the microbial surface sampling device 10 depicted includes a housing 12 having a disc cartridge receiving chamber 14 defined by an upstanding well portion 16 and removable cover portion 18. Mounted on the inner top surface of cover member 18 is a cartridge aligning member 20 dimensioned to receive and position the upper edge of a cartridge 22 carrying a plurality of microbial sampling discs 24.

Figures 6, 7, 8:
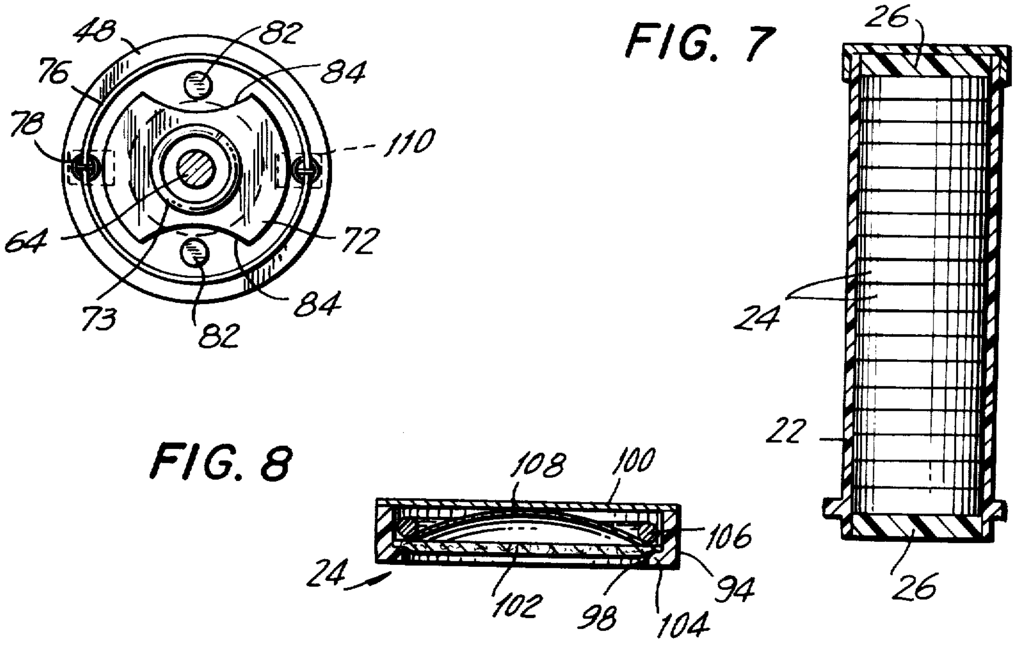
FIG. 6 is a sectional view taken along lines 6—6 of FIG. 4.
FIG. 7 is a sectional view of a cartridge for application to the microbial surface sampling device of FIG. 1.
FIG. 8 is a sectional view of one embodiment of a microbial sampling disc in accordance with the invention depicted in the storage mode.

Cartridge 22 is more particularly shown in FIG. 7 and consists of a tubular body containing a stack of discs 24. Sealing discs 26 define the two end of the stack of discs and serve to seal said ends to maintain discs 24 within the cartridge and to prevent contamination of said discs. The adhesive or other means for engaging sealing disc 26 against the cartridge 22 is selected such that pressure from spring 28 mounted on aligning member 20 within chamber 14 will break said seals to prevent the sequential dispensing of discs 24 in the manner described below.

Figure 2:
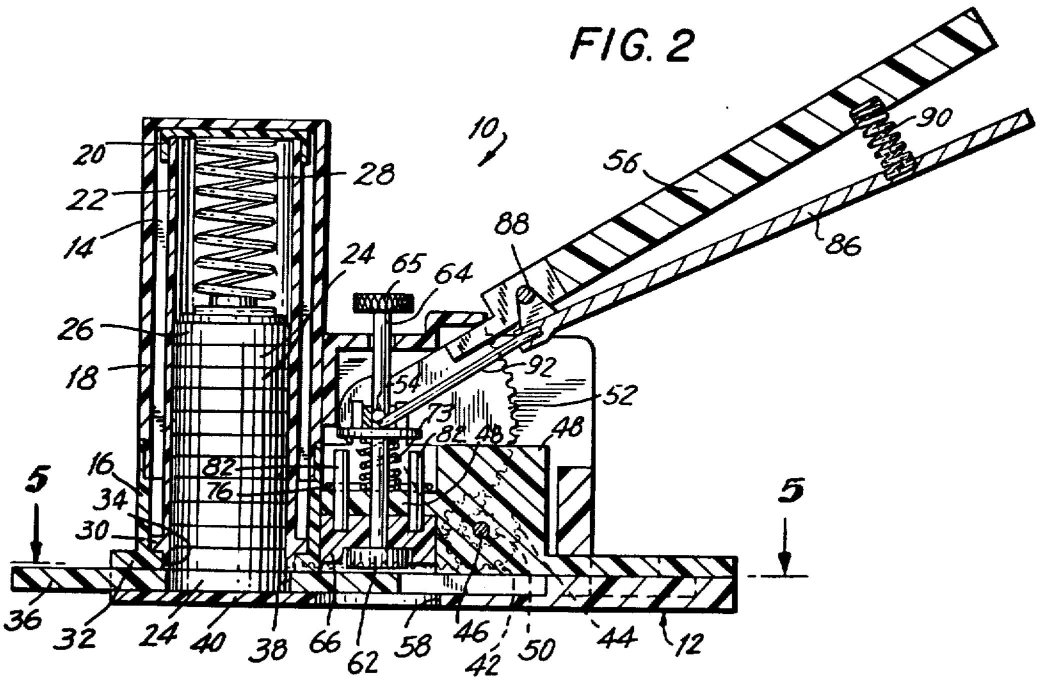
FIG. 2 is a sectional view taken along lines 2—2 of FIG. 1.

Cartridge 22 is formed with a radially extending flange 30 spaced from the bottom end thereof for engagement against a similar inwardly extending flange 32 formed on the inner bottom of well portion 16 of the housing. Flange 32 defines a central opening in the base of well 16 in registration with cartridge 22, to provide access for the discs 24 to a flat slide member 36 carried in housing 12. As more particularly shown in FIG. 5, slide member 36 is formed with an aperture 38 therethrough dimensioned to receive one of discs 24 when in registration with opening 34. Thus, when the slide member is positioned as depicted in FIG. 2, the pressure of spring 28 forces the next disc 24 through aperture 38 and against base portion 40 of housing 12. Slide member 36 is of a thickness equal to the thickness of each disc 24 so that when said slide member is displaced to the left as viewed in FIG. 2, in the manner described below, it carries with it the one disc received within aperture 38. As shown in FIGS. 2 and 5, slide member 36 is formed with toothed portions 42 on the upper surface thereof defining racks. A pinion gear 44 (FIGS. 2 and 4) is mounted on either end of a shaft 46 journaled through an inner support block portion 48 of frame 12 for respective engagement with each of rack portions 42. As particularly shown in FIG. 4, a spur gear 46 is mounted adjacent each pinion gear 44 on shaft 46 for rotation therewith. Each of said spur gears is in registration with a sector gear 52 mounted on shaft 54, which is also journaled in inner support block portion 48. A handle 56 is fixed to both sector gears 52 for pivotable rotation about the axis defined by shaft 54. When handle 56 is manually displaced in the downward direction from the position depicted in FIG. 2 to the position depicted in FIG. 3, slide member 36 is displaced to the right as viewed in FIGS. 2 and 3 due to the action of sector gears 52, spur gears 50, pinion gears 46 and rack 42. One of discs 24 is carried with slide member 36 to the position depicted in FIG. 3 at which it is in registration with an aperture 58 in base portion 40 of frame 12. A pair of coil springs 60 are provided joining the slide member and housing 12 to bias the slide member and handle to the normal position of FIG. 2 so that said handle is returned to the position of FIG. 2 when released.

Figure 4:
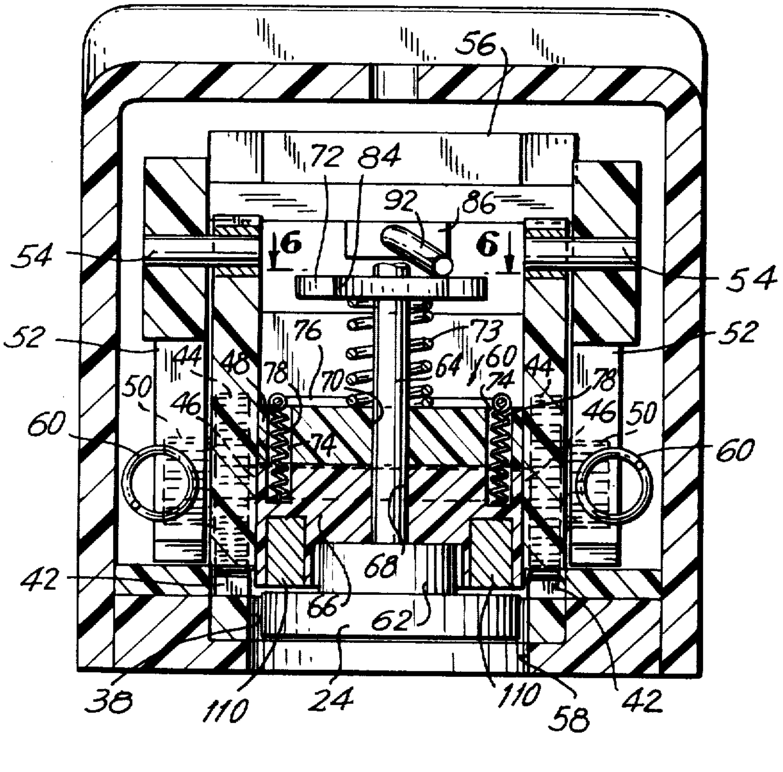
FIG. 4 is an enlarged sectional view taken along lines 4—4 of FIG. 3.
Figure 5:
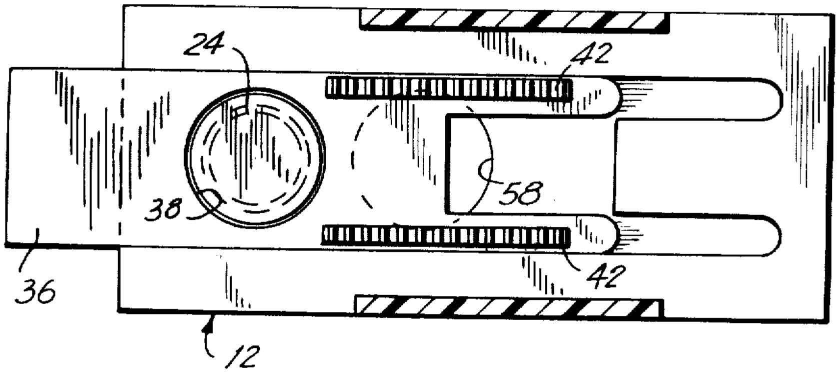
FIG. 5 is a sectional view taken along lines 5—5 of FIG. 2.

Also in registration with aperture 58 and disc 24 is a plunger assembly 60 most clearly shown in FIGS. 2, 4 and 6. Said assembly, which is mounted in inner support block portion 48, consists of a central plunger 62 supported on an axial shaft 64 and an outer plunger 66. Shaft 64 extends through a central aperture 68 in outer plunger 66 and an aperture 70 through inner support block portion 48 and projects out of housing 12, terminating in a knurled knob 65 (FIG. 2). A plate 72 is mounted on axial shaft 64 within housing 12 but spaced from inner support block portion 48. A coil spring 74 extends about shaft 64 intermediate the top surface of inner support block portion 48 and plate 72 to normally bias central plunger 62 in the upper position.

A first pair of axially extending apertures 74 (FIG. 4) are formed in inner support block portion 48 but spaced from aperture 70 through which shaft 64 extends. A ring 76 rests on the top surface of inner support block portion 48 and is dimensioned so as to extend across the opening of apertures 74. A coil spring 78 is received within each of apertures 74, one end of said coil springs being secured to ring 76, the other end of each of said coil springs being secured to central plunger 66 to bias said central plunger in the upper position.

Figure 3:
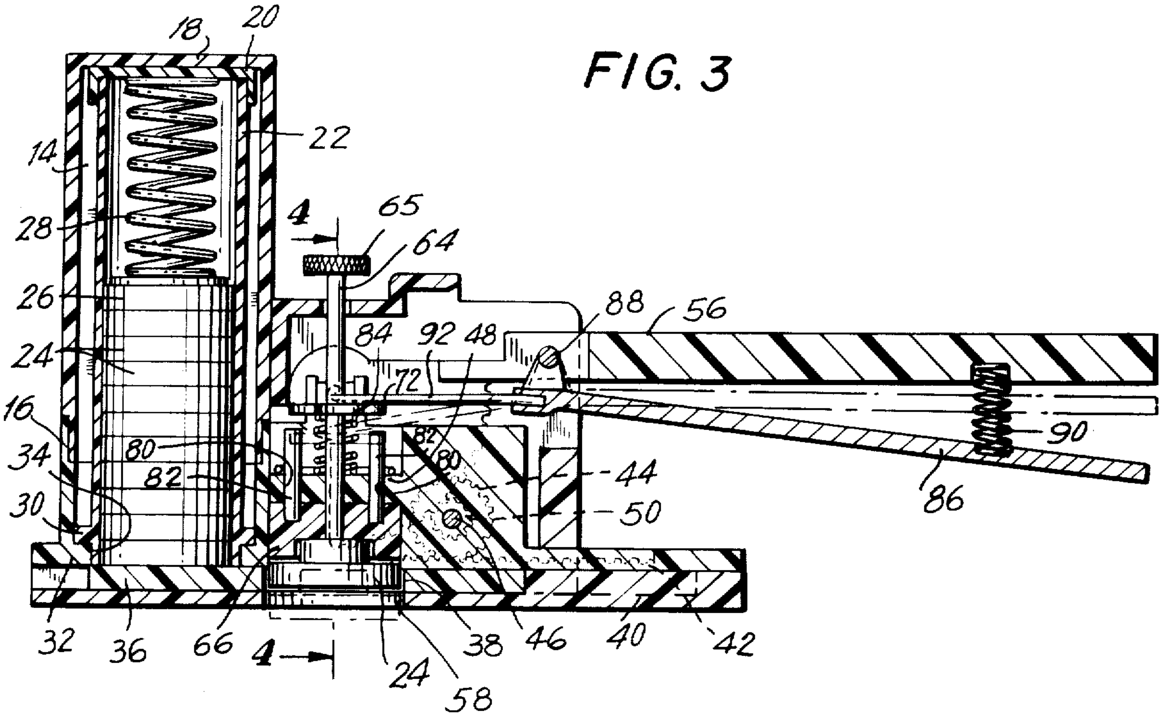
FIG. 3 is a sectional view corresponding to FIG. 2 after the partial operation of the device of FIG. 1.

As shown in FIG. 3, a further pair of apertures 80 are formed in inner support block 48 spaced from both apertures 74 and central apertures 70. A pin 82 fixed to outer plunger 66 extends through each aperture 80 and projects therefrom. As best shown in FIG. 6, plate 72 is formed with a pair of cut out regions 84 so that, when aligned as depicted in FIG. 6, central plunger 62 and shaft 64 may be displaced downwardly while leaving outer plunger 66 undisturbed. However, if plate 72 were rotated 90°, it would be in registration with pins 82, so that the downward displacement of shaft 64 and plate 72 would carry with it pins 82, and therefor outer plunger 66.

Plunger mechanism 60 is operated by means of finger grip bar 86 (FIGS. 2 and 3) pivotably mounted to handle 56 at pivot 88 and biased in the position shown in full lines in FIG. 3 by spring 90. Finger 92 is mounted on the end of arm 86, the end of said finger resting on plate 72. When bar 86 is pulled toward handle 56 by the fingers of the user, finger 82 is pivoted downwardly to the position shown by phantom lines 92' in FIG. 3, carrying with it plate 72, shaft 64 and central plunger 62. If knob 66 were rotated 90 as discussed above, the displacement of arm 86 would cause the simultaneous downward displacement of both central plunger 62 and outer plunger 66.

Figure 9:
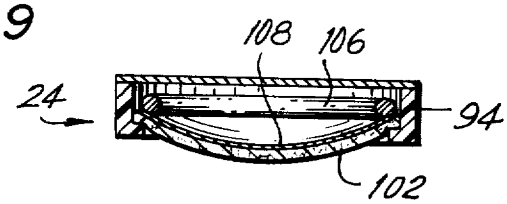
FIG. 9 is a sectional view of the disc of FIG. 8 depicted in the operative mode.

Before describing the operation of said plungers, reference is had to FIGS. 8 and 9 which depicts one embodiment of a disc 24 in accordance with the invention. The embodiment of FIGS. 8 and 9 consist of a circular housing 94 having a lower surface 96 formed with an aperture 98 therethrough. The upper end of housing 94 is closed by a thin paper of plastic membrane 100. A surface sampling material 102 is received within housing 94, the peripheral edge thereof resting on a flange 104 defining the periphery of aperture 98. Surface sampling material 102 is held in place by a radially tensioned steel wire ring 106 which is snap fitted against the walls of housing 94 immediately behind surface sampling material 102. Also retained by said wire ring is a thin disc 108 formed of a material such as tempered aluminum and stressed in a manner similar to a bellville spring. When pressure is applied to the convex surface of spring 108, the curvature thereof reverses to the position depicted in FIG. 9 to project the surface sampling material 102 beyond surface 96. Thus, if one of discs 24 were in registration with central plunger 62 when said central plunger was displaced downwardly, disc 24 would be carried against the surface to be sampled, and spring 108 would be reversed to cause the engagement of surface sampling material 102 against the surface. A significant portion of the bacterial contamination present on the surface is then transferred mechanically and electrostatically to the surface sampling material. The surface sampling material is biocompatable and particularly adapted to pick up microbial contamination from the surface being sampled. The material is preferably flexible or resilient to permit conforming to irregular surfaces and should withstand sterilization. The surface should exhibit a charge pheonomina favorable to picking up bacteria. One example of such material is TFE (polytetrafluorethane).

Outer plunger 66 has at least two permanent magnets 10 embedded in the outer surface thereof. These permanent magnets attract the steel ring 106 to retain disc 24 against central plunger 62, in the position depicted in full lines in FIGS. 3 and 4, before arm 86 is displaced towards handle 56. This magnetic bond would be broken when plunger 62 is displaced, by itself, so that disc 24 is left on the surface to be sampled after being forced thereagainst by the operation of central plunger 62, as shown in phantom lines in FIG. 3. On the other hand, when plate 72 is disposed so that outer plunger 66 is also displaced in response to the displacement of arm 86, then the permanent magnets are maintained close to steel ring 106 during the displacement of disc 24. Thus, when arm 86 is released, disc 24 is carried back to the position shown in full lines in FIGS. 3 and 4 with the plunger assembly 60. This feature of the surface sampling device 10 permits the sampling of other than horizontal surfaces, since the disc is not permitted to fall freely after the sampling device is removed from the surface.

Figure 10:
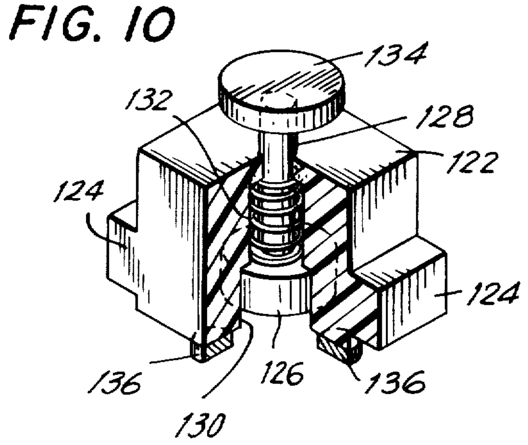
FIG. 10 is a partially sectioned view of a transfer device according to the invention.
Figure 11:
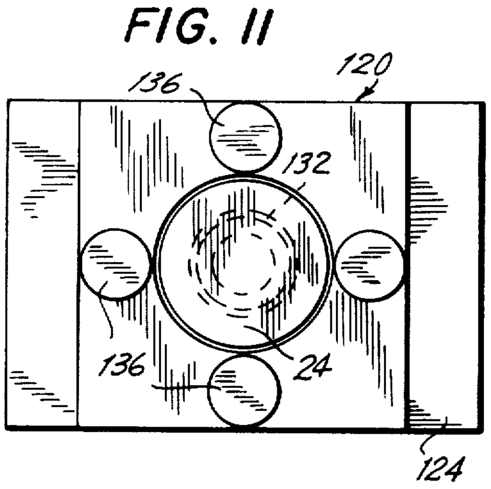
FIG. 11 is a bottom plan view of the transfer device of FIG. 10.
Figures 12, 13:
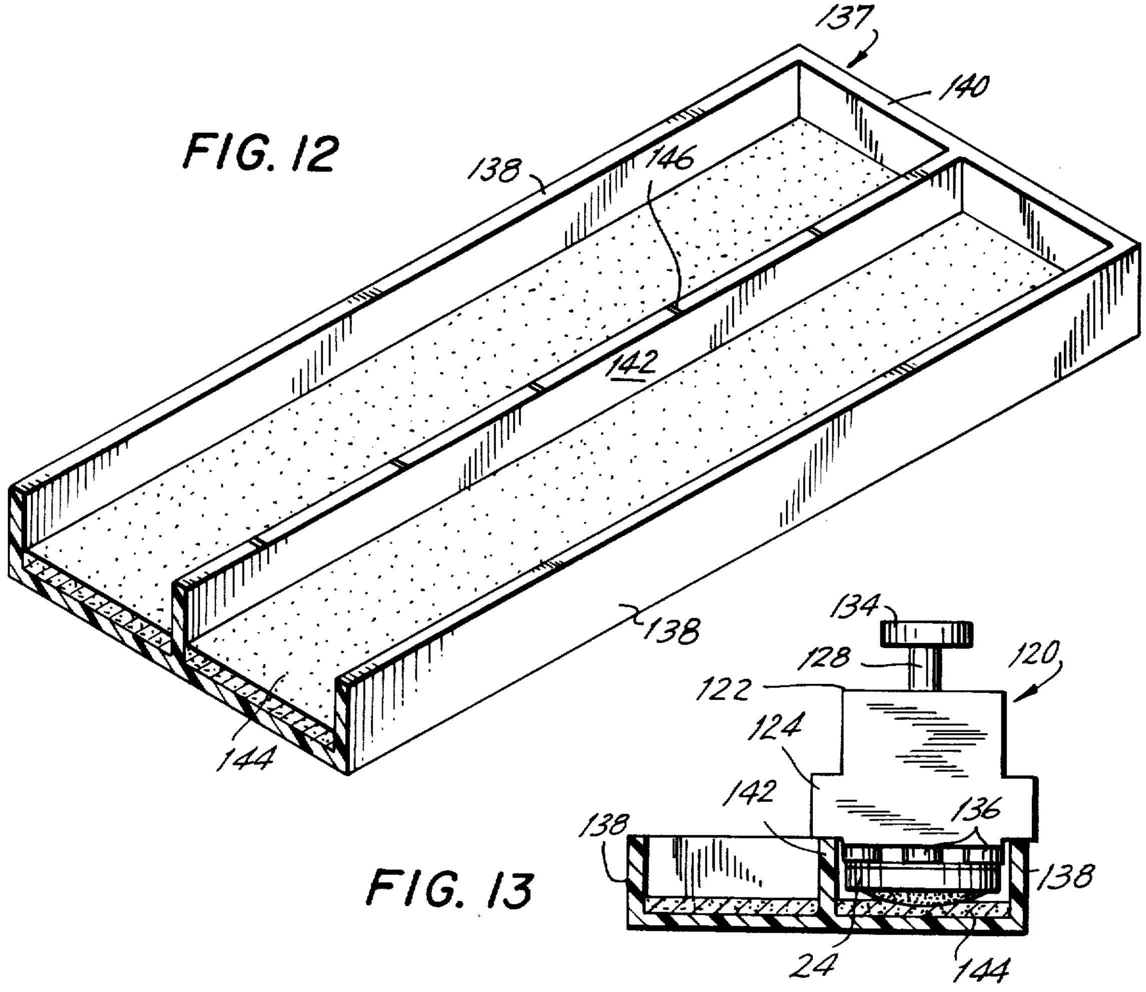
FIG. 12 is a fragmentary perspective view of a first embodiment of a culture plate in accordance with the invention.
FIG. 13 is a sectional view of a culture plate of the type of FIg. 12 showing the transfer device of FIG. 10 positioned therein.

When the disc is left on the surface, a special transfer device 120, depicted in FIGS. 10 and 11, may be utilized to transfer the disc to a culture plate for transfer of any bacterial contamination to a culture medium. Transfer device 120 consists of a block 122 having a pair of laterally extending flanges 124 projecting from the sides thereof. A plunger 126 is mounted on a shaft 128 extending through a central aperture in block 122. Plunger 126 is maintained in an upper position in a correspondingly dimensioned recess 130 in the bottom surface of block 122 by means of a spring 132 secured to both block 122 and plunger 126. A knob 134 is secured to the upper end of shaft 128 for the manipulation of plunger 126. Four permanent magnets 136 are spaced about recess 130 for cooperation with the steel ring 106 of disc 24. Thus, transfer device 120 is adapted to pick up a disc 24 after it has been deposited on a surface to be sampled by device 10, and to deposit said disc on a suitably designed culture plate. Such a culture plate is depicted in FIG. 12, and consists of a shell 137 defined by upstanding peripheral side walls 138 and an upstanding peripheral end wall 140. Spaced midway between and extending substantially parallel to side walls 138 is an upstanding central wall 142. Received in the two compartments defined by said upstanding wall is a suitable culture medium 144. As more particularly shown in FIG. 13, transfer device 10 is dimensioned so that flanges 124 thereof rest on one of walls 138 and wall 142, and hold disc 24 so that the projecting surface sampling material 102, and only that material, extends into the culture medium for the transfer of bacteria thereto.

Central wall 142 may be provided with spaced markings 146 for indicating the positioning of transfer device 120 so that each disc 24 can be applied to a different location. Suitable labels could be applied to the outside of the upstanding walls to identify each sample.

Figure 14:
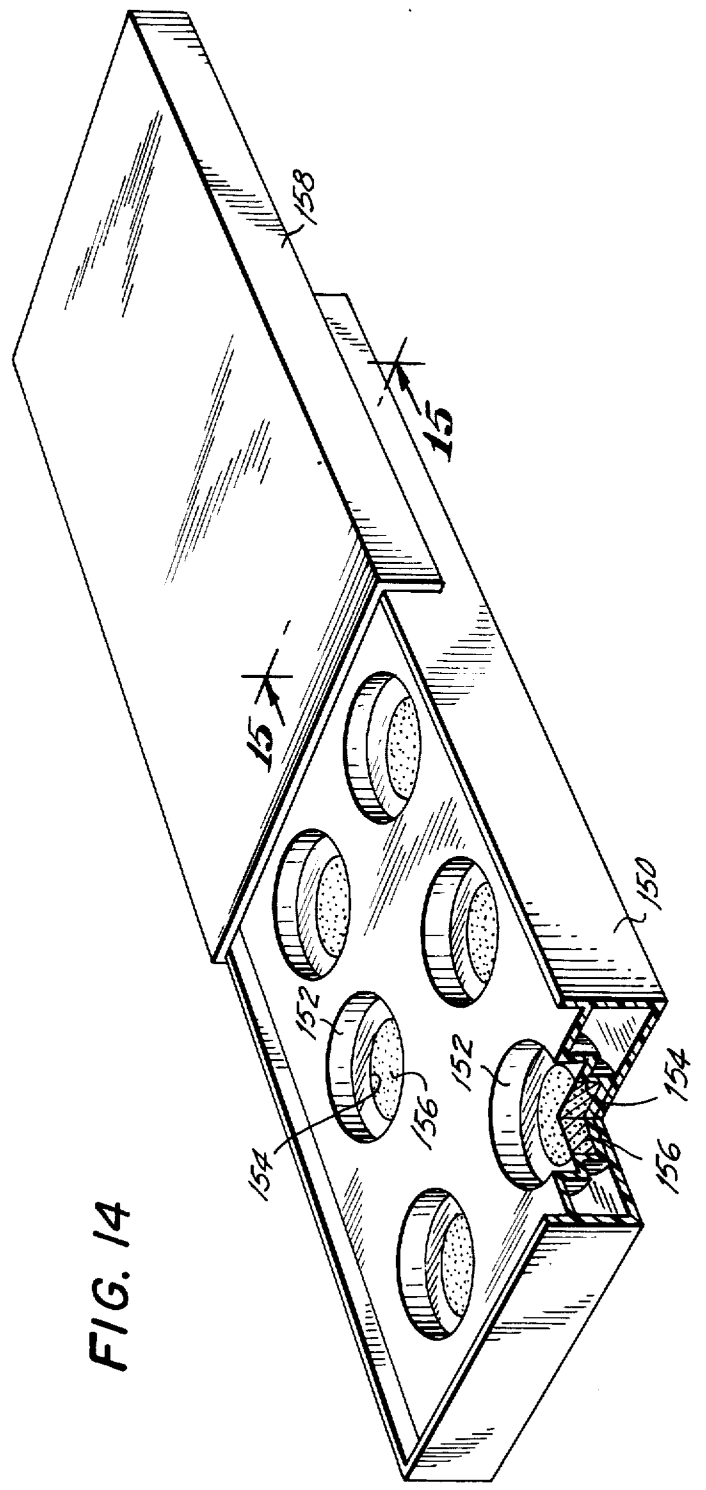
FIG. 14 is a partially sectioned view of a second embodiment of a culture plate in accordance with the invention.
Figure 15:
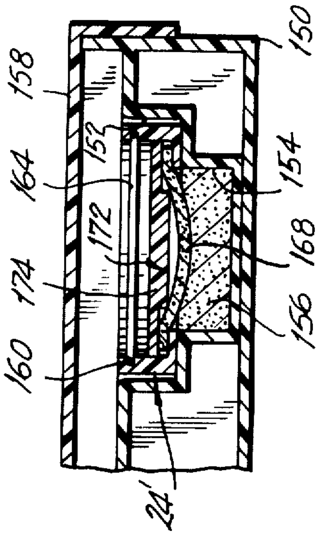
FIG. 15 is a fragmentary sectional view taken along lines 15—15 of FIG. 14 showing a second embodiment of the surface sampling disc in accordance with the invention in the operative mode disposed therein.

A second embodiment of a culture plate is depicted in FIGS. 14 and 15. In said embodiment, instead of two compartments, the culture plate has a plurality of recesses 152 therein, each of said recesses being dimensioned to receive one of discs 24. At the base of recess 152 is an inner recess 154 filled with a culture medium 156. Inner recess 154 would be dimensioned so that only the protruding surface sampling material 102 would be engaged with the culture medium. The embodiment of FIGS. 14 and 15 uses a minimum amount of culture medium and insures that there is no contamination from one sample into the region of the culture medium associated with another sample. A cover 158 may be provided for base 150 for shipping and storage.

Figure 16:
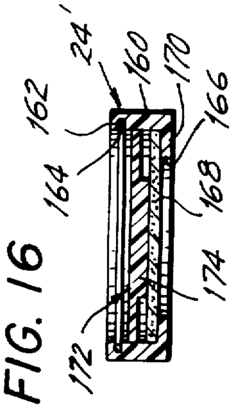
FIG. 16 is a sectional view of the disc of FIG. 15 disposed in the storage mode.

A second embodiment of the surface sampling disc in accordance with the invention is depicted in FIGS. 15 and 16. Disc 24' consists of an outer housing 160 similar in construction to outer housing 94, but provided with an annular groove 162 on the inner surface thereof in the region spaced from bottom aperture 166. A steel ring 164 is received within aperture 162 to provide material of high magnetic permeability for cooperation with the permanent magnets of surface sampling device 10. A disc of the surface sampling material 168 is received within housing 160 and rests on flange 170 defining aperture 166. Also received within housing 160 is a plastic disc 172 dimensioned to snugly fit within the chamber defined by housing 160. Plastic disc 172 is provided with a projecting portion 174 facing and in registration with aperture 166. Projecting portion 174 will cause surface sampling material 168 to project out of aperture 166 when plastic disc 172 is displaced toward flange 170 by the action of central plunger 62. This dispostion of the disc 24' is depicted in FIG. 15.

While the embodiment of the surface sampling device 10 in accordance with the invention depicted in the drawings incorporates a gear arrangement for displacing slide member 36, any other suitable arrangement, such as a pivoted lever arrangement may be substituted therefor. Similarly, outer plunger 66 may be permanently joined with central plunger 62, if desired, or may be dispensed with completely if desired. Further, while in the embodiment depicted in the drawings, the selection between one or both of outer and central plungers 66 and 62 is made by rotating plate 72 by means of knob 65, other mechanisms for achieving the same results may be utilized. Thus, finger grip bar 86 may be mounted for lateral pivoting relative to handle 56 and separate side by side plates may be secured to shaft 64 and pins 82. In such an embodiment, the end of finger 92 would be broadened to selectively engage the one of the plates associated with shaft 64 in a first lateral position for the separate operation of central plunger 66. In a second lateral position of said finger grip bar, the end of finger 92 would engage both of the plates for the simultaneous operation of the outer and central plungers. In addition, the plunger may contain the coil of an electromagnet, and a suitable electric circuit may be provided for actuation of the electromagnet to effect cooperation with the material of high permeability in the plastic disc.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A surface sampler device for use with surface sampler discs having surface sampling material positioned on one side thereof comprising housing means having an aperture therethrough dimensioned to permit the passage of a disc therethrough; cartridge means for holding a plurality of said discs mounted on said housing; plunger means mounted in said housing in registration with said aperture; means mounted on said housing for selectively and sequentially feeding each of said discs from said cartridge means into registration with said aperture; and means in said housing for selectively actuating said plunger means to engage said disc through said aperture and to engage the surface sampling material thereof against the surface to be sampled.

2. A surface sampler device as recited in claim 1, wherein said surface sampler discs are formed with an aperture in said one side thereof, said surface sampling material being normally recessed in said aperture in said discs, said discs including means for projecting said surface sampling material through said aperture in said discs in response to pressure applied to the side of said discs opposed to said one side thereof; said plunger means being positioned and dimensioned for applying pressure to said other side of said discs to project and engage said surface sampling material against said surface.

3. A surface sampler device as recited in claim 1, wherein said surface sampler disc includes a material of high magnetic permeability, said plunger means including magnet means for cooperation with said material of high permeability for retaining the surface sampler disc in registration with said plunger means in contact therewith.

4. A surface sampler device as recited in claim 3, wherein said plunger means includes a central plunger and an outer plunger, said outer plunger including said magnet means, said means for displacing said plunger means being adapted for the selective operative displacement of either said central plunger alone, or the combination of said central plunger and said outer plunger, whereby said surface sampling disc is retained against said outer plunger after operative displacement of the combination of said outer and central plungers.

5. A surface sampler device as recited in claim 1, wherein said cartridge means includes container means for carrying a stack of said discs, said container means having an opening at at least one end thereof dimensioned to permit the passage of said discs therethrough; and means for biasing said stack of discs toward said opening; said means for feeding said discs including a slide member slidably mounted in said housing and formed with an aperture therethrough dimensioned to receive one of said discs, said slide member being of a thickness substantially equal to the thickness of one of said discs, said feeding means including means for selectively and sequentially displacing said slide member between a first position at which the aperture therethrough is in registration with the opening in said container means for receiving a disc from said stack and a second position in registration with said aperture in said housing and said plunger means.

6. A surface sampler device as recited in claim 5, wherein said means for displacing said slide member includes a manually pivotable handle mounted on said housing and means mounted on said housing operatively coupling said slide member and said handle for the displacement of said slide member in response to the manual pivoting of said handle.

7. A surface sampler device as recited in claim 6, wherein said means for displacing said plunger means includes a finger grip bar pivotably mounted on said handle for manual pivotable displacement toward and away from said handle, said finger grip bar including a projecting finger operatively coupled to said plunger means for displacing said plunger means in response to the pivoting of said finger grip bar.

8. A surface sampler device as recited in claim 1, wherein said plunger means includes spring means for biasing said plunger means in a position spaced from said aperture in said housing for returning said plunger means to said spaced position after displacement thereof by said means for displacing said plunger means.

9. A transfer device for use with surface sampler discs having surface sampling material positioned on one side thereof and including material of a high magnetic permeability, comprising housing means having a central aperture therethrough; magnet means mounted on said housing means in the region of one opening of said aperture; and plunger means mounted within said aperture in said housing means for manual selective displacement between a first position recessed within said aperture from said magnet means and a second position projecting through said aperture opening beyond said magnet means, whereby said transfer device may pick up one of said surface sampler discs when said plunger means is in said first position and said disc may be released when said plunger means is operatively displaced from said first to said second position.

10. A transfer device as recited in claim 9, including spring means for normally biasing said plunger means in said first position.

11. A transfer device as recited in claim 10, wherein said housing means is formed with laterally projecting flange means for resting on the upstanding walls of a culture plate means, said flanges being spaced from the side of said housing through which said aperture opening extends a distance such that when engaged against said upstanding wall, the surface sampling material engages culture medium within said culture plate means.

12. A surface sampler disc comprising a housing formed with a central chamber and openings in opposed sides thereof providing access to said central chamber; surface sampling material mounted within said chamber adjacent a first of said openings; and means mounted within said chamber and displaceable between a first position spaced from said first aperture and a second position at which said surface sampling material is projected through said first aperture in response to pressure applied to said means through the second of said apertures, said displaceable means including Belleville spring means mounted within said housing and disposed with its concave curvature facing said first aperture said Belleville spring means being adapted for flexing in response to pressure applied thereto through said second aperture to flex so that the convex curvature thereof faces said first aperture.

13. A surface sampler disc as recited in claim 12, wherein said displaceable means includes a plunger member formed with a central projecting portion intermediate said surface sampling material and said spring means facing said first aperture.

14. A surface sampler disc as recited in claim 12, and including material of a high magnetic permeability.

15. A culture plate for use with a surface sampler disc having surface material positioned for projection through an aperture therein, comprising a base portion having a plurality of spaced wells formed therein, each of said wells having a bottom wall, and each of said wells being dimensioned to receive one of said discs, each of said wells being formed with a further well of smaller lateral dimension in the bottom surface thereof, said lateral dimension of said further well being selected to receive at least a portion of said projecting surface sampling material while permitting said surface sampling disc to rest on the bottom well of said first mentioned well; and culture medium received within said further well for engagement by the surface sampling material of a disc positioned within said first-mentioned well.

16. A surface sampler system comprising surface sampler disc means including disc housing means having an aperture in one side thereof, and surface sampling material positioned within said housing adjacent said disc housing aperture; and surface sampler device means including device housing means having an aperture therethrough dimensioned to permit the passage of a disc therethrough, cartridge means for holding a plurality of said discs mounted on said device housing, plunger means mounted in said device housing in registration with said device housing aperture; means mounted on said device housing to selectively and sequentially feed each of said discs from said cartridge means into registration with said device housing aperture, and means in said device housing for selectively actuating said plunger means to engage said disc through said device housing aperture and to engage the surface sampling material against the surface to be sampled.

17. A surface sampling system as recited in claim 1, wherein said surface sampler disc includes a material of high magnetic permeability, said plunger means including magnet means for cooperation with said material of high magnetic permeability for retaining the surface sampler disc in registration with said plunger means in contact therewith.

18. A surface sampler system as recited in claim 17, wherein said plunger means includes a central plunger dimensioned and positioned to apply the pressure required for projecting said surface sampling material through said disc and an outer plunger including said magnet means, said means for displacing said plunger means adapted for the selective operative displacement of either said central plunger alone, or the combination of said central plunger and said outer plunger, whereby said surface sampling disc is retained against said outer plunger after operative displacement of the combination of said outer and central plungers.

19. A surface sampler system as recited in claim 18, including transfer device means having housing means formed with a central aperture therethrough, further magnet means mounted on said transfer device housing means in the region of one opening of said aperture, and plunger means mounted within said transfer device housing aperture for manual selective displacement between a first position recessed within said aperture from said magnet means and a second position projecting through said aperture opening beyond said permanent magnet means, whereby said transfer device may pick up one of said surface sampler discs when said plunger is in said first position and said disc may be released when said plunger means is operatively displaced from said first to said second position.

20. A surface sampler system as recited in claim 19, including culture plate means formed with a pair of spaced upstanding walls and including culture medium received between said walls, said transfer device housing being formed with laterally extending flanges spaced from the side of said housing through which said aperture opening extends such that when said flanges rest on said pair of upstanding walls of said culture plate, only the projecting surface sampling material of a disc engaged against said further permanent magnet means engages against said culture medium.

21. A surface sampling system as recited in claim 20, wherein marking means are provided on at least one of said upstanding walls of said culture plate for identifying discrete positions for the selective placement of said transfer device.

22. A surface sampling system as recited in claim 16, and including culture plate means having a base portion formed with a plurality of spaced wells therein, each of said wells being dimensioned to receive one of said surface sampler disc means and having a bottom wall, each of said wells being formed with a further well in the respective bottom wall thereof of smaller lateral dimension, said lateral dimension being selected so that at least a portion of the projecting surface sampling material projects therein; and culture medium received within each of said further wells for engagement by said projecting surface sampling material.

23. A surface sampler system as recited in claim 16, including means in said surface sampling disc means for projecting said surface sampling material through said disc housing aperture having plunger means formed with a projection portion facing said aperture and displaceable toward said aperture by said plunger means.

24. A surface sampler system as recited in claim 16, including means for projecting said surface sampling material through said disc housing aperture having Belleville spring means mounted within said housing with the concave curvature thereof facing said aperture and adapted for flexing in response to engagement by said plunger means so that the concave curvature thereof engages said surface sampling material.

25. A surface sampler disc comprises a housing having an opening on at least one side thereof; surface sampling material received within said housing and positioned adjacent said opening for projection therethrough out of said housing; said housing including a material of high magnetic permeability in regions thereof surrounding said opening.

26. A surface sampler disc as recited in claim 25, wherein said housing is formed of a plastic material and supports a substantially ring-shaped member formed of a material of high magnetic premeability in a region substantially surrounding said opening.

27. A surface sampler system comprising surface sampler disc means including disc housing means having an opening in one side thereof and surface sampling material positioned within said housing adjacent said disc housing means opening for projection therethrough, said disc housing means including a material of high magnetic permeability; and transfer device means including transfer device housing means having an aperture therethrough; magnet means mounted on said housing means in the region of one opening of said aperture for cooperating with said material of high magnetic permeability of said sampler disc means to retain said sampler disc means against said transfer device housing means in registration with said opening of said aperture; and plunger means mounted within said aperture in said housing means for manual selective displacement between a first position recessed within said aperture from said magnet means and a second position projecting through said aperture opening beyond said magnet means, whereby said transfer device may pick up one of said surface sampler discs when said plunger means is in said first position and said disc may be released when said plunger means is operatively displaced from said first position to said second position.

* * * * *